(12) United States Patent
Cunningham et al.

(10) Patent No.: US 9,066,270 B2
(45) Date of Patent: Jun. 23, 2015

(54) GSM CHANNEL TRACKING

(71) Applicant: RAYTHEON APPLIED SIGNAL TECHNOLOGY, INC., Sunnyvale, CA (US)

(72) Inventors: Daniel Cunningham, Sunnyvale, CA (US); Peter Guastaferro, Sunnyvale, CA (US)

(73) Assignee: Raytheon Applied Signal Technology, Inc., Sunnyvale, CA (US)

( * ) Notice: Subject to any disclaimer, the term of this patent is extended or adjusted under 35 U.S.C. 154(b) by 187 days.

(21) Appl. No.: 13/837,271

(22) Filed: Mar. 15, 2013

(65) Prior Publication Data

US 2014/0274054 A1 Sep. 18, 2014

(51) Int. Cl.
*H04W 24/00* (2009.01)
*H04W 36/00* (2009.01)
*H04W 24/08* (2009.01)

(52) U.S. Cl.
CPC .......... *H04W 36/0066* (2013.01); *H04W 24/08* (2013.01)

(58) Field of Classification Search
CPC ..... H04W 24/00; H04W 24/08; H04W 24/06; H04W 16/18; H04W 36/0066
USPC ........... 455/403, 404.1, 404.2, 405, 406, 408, 455/410, 414.1, 414.2, 415, 418–420, 423, 455/424, 436, 450, 456.1, 456.2
See application file for complete search history.

(56) References Cited

U.S. PATENT DOCUMENTS

| | | | |
|---|---|---|---|
| 5,781,628 A | 7/1998 | Alperovich et al. | |
| 5,884,175 A * | 3/1999 | Schiefer et al. | 455/436 |
| 5,913,161 A | 6/1999 | Ozulkulu et al. | |
| 6,236,856 B1 * | 5/2001 | Abbadessa | 455/423 |
| 6,424,701 B1 | 7/2002 | Maillet et al. | |
| 6,768,719 B1 | 7/2004 | Couaillet | |
| 7,193,988 B2 | 3/2007 | Niemelä et al. | |
| 7,580,678 B2 | 8/2009 | Byman-Kivivuori et al. | |
| 2002/0003783 A1 * | 1/2002 | Niemela et al. | 370/329 |
| 2002/0009991 A1 | 1/2002 | Lu et al. | |
| 2004/0075675 A1 | 4/2004 | Raivisto et al. | |
| 2004/0087273 A1 | 5/2004 | Perttila et al. | |
| 2004/0203944 A1 | 10/2004 | Huomo et al. | |
| 2005/0003831 A1 * | 1/2005 | Anderson | 455/456.1 |
| 2005/0130645 A1 * | 6/2005 | Dobson et al. | 455/423 |
| 2006/0111124 A1 * | 5/2006 | Kennedy et al. | 455/456.1 |
| 2006/0240836 A1 * | 10/2006 | Kennedy et al. | 455/450 |

(Continued)

OTHER PUBLICATIONS

Andersson et al., "GSM transport evolution", Ericsson Review, 1:26-31, 2007.

(Continued)

*Primary Examiner* — Magdi Elhag
(74) *Attorney, Agent, or Firm* — Christie, Parker & Hale, LLP

(57) ABSTRACT

A system and method for determining a correspondence between an Abis signaling channel and an air channel frequency designator. A monitoring instrument may be connected to multiple E1 circuits, monitoring messages sent on Abis signaling channels. By repeatedly observing channel activation messages (135) preceding channel assignment messages (145) of interest, or channel assignment messages (145) following channel activation messages (135) of interest, the instrument may infer a correspondence between an Abis signaling channel and an air channel frequency designator.

17 Claims, 3 Drawing Sheets

(56) References Cited

U.S. PATENT DOCUMENTS

2008/0318556 A1   12/2008   Erol et al.
2009/0323604 A1   12/2009   De Jaeger et al.
2010/0297995 A1   11/2010   Macias et al.

OTHER PUBLICATIONS

Willig, Andreas, The GSM Air Interface Fundamentals and Protocols, Communication Networks Group Hasso-Plattner-Institute University of Potsdam, May 20, 2003, 49 pages.

Abis interface Technical Report for cdma2000 Spread Spectrum System (A.R0003: Abis Technical Report), 3rd Generation Partnership Project 2 "3GPP2", Dec. 17, 1999.

http://en.wikipedia.org/wiki/Base_station_subsystem; last visited Jan. 13, 2012.

http://samiramberkar-tutorials.blogspot.com/2010/03/gsm-9.html; last visited Jan. 14, 2012.

http://www.acacia-net.com/wwwcla/protocol/gsmabis.htm; last visited Jan. 14, 2012.

http://www.memotec.com/products_cx-ua.php?print&show=1st; last visited Jan. 14, 2012.

http://www.gsmfordummies.com/architecture/arch.shtml; last visited Jan. 14, 2012.

* cited by examiner

GSM CHANNEL TRACKING

STATEMENT REGARDING FEDERALLY SPONSORED RESEARCH OR DEVELOPMENT

This invention was made with U.S. Government support under contract No. H98230-09-D-0070/002 awarded by the National Security Agency. The U.S. Government has certain rights in this invention.

BACKGROUND

1. Field

One or more aspects of embodiments according to the present invention relate to methods for monitoring traffic on mobile telephone networks, and more particularly to a method of correlating Abis signaling channels and air channel frequency designators using channel assignment messages and channel activation messages in a mobile telephone network.

2. Description of Related Art

A common task when monitoring mobile telephone networks, e.g., for the purpose of troubleshooting, is the monitoring of a handover. In a handover, a mobile device is switched from using one frequency and channel combination to another, i.e., on the air interface, i.e., on the interface in which signals propagate through air as free space electromagnetic waves.

It may be advantageous for an instrument monitoring a call in which a handover occurs to be able to continue monitoring the call immediately after the handover, to diagnose, for example, problems that may arise during handovers. This may be challenging because the instrument may be able to observe the termination of the call on one channel, but the channel on which the call is continued may not be apparent. Thus, there is a need for a method for tracking a call during a handover.

SUMMARY

In a system and method for determining a correspondence between an Abis signaling channel and an air channel frequency designator, a monitoring instrument may be connected to multiple E1 circuits, monitoring messages sent on Abis signaling channels. By repeatedly observing channel activation messages preceding channel assignment messages of interest, or channel assignment messages following channel activation messages of interest, the instrument may infer a correspondence between an Abis signaling channel and an air channel frequency designator.

According to an embodiment of the present invention there is provided a monitoring instrument, including: a processor; and a memory, wherein the memory has stored thereon instructions that, when executed by the processor, cause the processor: to determine a correspondence between a Global System for Mobile Communications (GSM) air channel frequency designator and an Abis signaling channel, by detecting a first channel activation message on the Abis signaling channel; detecting, during a first time interval following the first channel activation message, a first set of one or more frequency designators; detecting a second channel activation message on the Abis signaling channel; detecting, during a second time interval following the second channel activation message, a second set of one or more frequency designators; and forming a list of candidate frequency designators including frequency designators included in the first set of one or more frequency designators and in the second set of one or more frequency designators; and to use the correspondence to follow a call through a handover.

In one embodiment, the first set of one or more frequency designators and the second set of one or more frequency designators include one or more absolute radio frequency channel numbers (ARFCNs).

In one embodiment, the first set of one or more frequency designators and the second set of one or more frequency designators include one or more mobile allocation index offsets (MAIOs) and one or more hopping sequence numbers (HSNs).

In one embodiment, the Abis signaling channel is a channel on an E1 circuit.

In one embodiment, the length of each of the first time interval and the second time interval is more than 2 seconds and less than 10 seconds.

In one embodiment, the detecting of the first channel activation message on the Abis signaling channel includes detecting a first channel activation message having a first air channel time slot; the detecting, during a first time interval following the first channel activation message, of a first set of one or more frequency designators includes detecting a set of one or more frequency designators associated in channel assignment messages with the first air channel time slot; the detecting of a second channel activation message on the Abis signaling channel includes detecting a second channel activation message having a second air channel time slot; and the detecting, during a second time interval following the second channel activation message, of a second set of one or more frequency designators includes detecting a set of one or more frequency designators associated in channel assignment messages with the second air channel time slot.

According to an embodiment of the present invention there is provided a method for monitoring a Global System for Mobile Communications (GSM) network, the method including: determining a correspondence between a air channel frequency designator and an Abis signaling channel; and using the correspondence to follow a call through a handover, the determining including: detecting a first channel activation message on the Abis signaling channel; detecting, during a first time interval following the first channel activation message, a first set of one or more frequency designators; detecting a second channel activation message on the Abis signaling channel; detecting, during a second time interval following the second channel activation message, a second set of one or more frequency designators; and forming a list of candidate frequency designators including frequency designators included in the first set of one or more frequency designators and in the second set of one or more frequency designators.

In one embodiment, the first set of one or more frequency designators and the second set of one or more frequency designators include one or more absolute radio frequency channel numbers (ARFCNs).

In one embodiment, the first set of one or more frequency designators and the second set of one or more frequency designators include one or more mobile allocation index offsets (MAIOs) and one or more hopping sequence numbers (HSNs).

In one embodiment, the Abis signaling channel is a channel on an E1 circuit.

In one embodiment, the length of each of the first time interval and the second time interval is more than 2 seconds and less than 10 seconds.

According to an embodiment of the present invention there is provided a monitoring instrument, including: a processor; and a memory, wherein the memory has stored thereon instructions that, when executed by the processor, cause the processor: to determine a correspondence between a Global System for Mobile Communications (GSM) air channel frequency designator and an Abis signaling channel, by detecting a first channel assignment message containing a first air channel frequency designator; detecting, during a first time interval preceding the first channel assignment message, a first set of one or more Abis signaling channel activation messages for activating a first set of one or more Abis signaling channels; detecting a second channel assignment message containing the first air channel frequency designator; detecting, during a second time interval preceding the second channel assignment message, a second set of one or more Abis signaling channel activation messages for activating a second set of one or more Abis signaling channels; and forming a list of candidate Abis signaling channels including Abis signaling channels included in the first set of one or more Abis signaling channels and in the second set of one or more Abis signaling channels; and to use the correspondence to follow a call through a handover.

In one embodiment, the frequency designator is an absolute radio frequency channel number (ARFCN).

In one embodiment, the frequency designator is a combination of a mobile allocation index offset and a hopping sequence number (HSN).

In one embodiment, the Abis signaling channel is a channel on an E1 circuit.

In one embodiment, the length of each of the first time interval and the second time interval is more than 2 seconds and less than 10 seconds.

In one embodiment, the detecting of the first channel assignment message containing a first air channel frequency designator includes detecting a first channel assignment message containing a first air channel frequency designator and a first air channel time slot; the detecting, during a first time interval preceding the first channel assignment message, a first set of one or more Abis signaling channel activation messages for activating a first set of one or more Abis signaling channels includes detecting, during a first time interval preceding the first channel assignment message, a first set of one or more Abis signaling channel activation messages, having a first air channel time slot, for activating a first set of one or more Abis signaling channels; the detecting of a second channel assignment message containing the first air channel frequency designator includes detecting a second channel assignment message containing the first air channel frequency designator and a second channel time slot; and the detecting, during a second time interval preceding the second channel assignment message, of a second set of one or more Abis signaling channel activation messages for activating a second set of one or more Abis signaling channels includes detecting, during a second time interval preceding the second channel assignment message, a second set of one or more Abis signaling channel activation messages, having a second air channel time slot, for activating a second set of one or more Abis signaling channels.

BRIEF DESCRIPTION OF THE DRAWINGS

Features, aspects, and embodiments are described in conjunction with the attached drawings, in which.

DETAILED DESCRIPTION

The detailed description set forth below in connection with the appended drawings is intended as a description of exemplary embodiments of a method for GSM channel tracking provided in accordance with the present invention and is not intended to represent the only forms in which the present invention may be constructed or utilized. The description sets forth the features of the present invention in connection with the illustrated embodiments. It is to be understood, however, that the same or equivalent functions and structures may be accomplished by different embodiments that are also intended to be encompassed within the spirit and scope of the invention. As denoted elsewhere herein, like element numbers are intended to indicate like elements or features.

Figure 1:
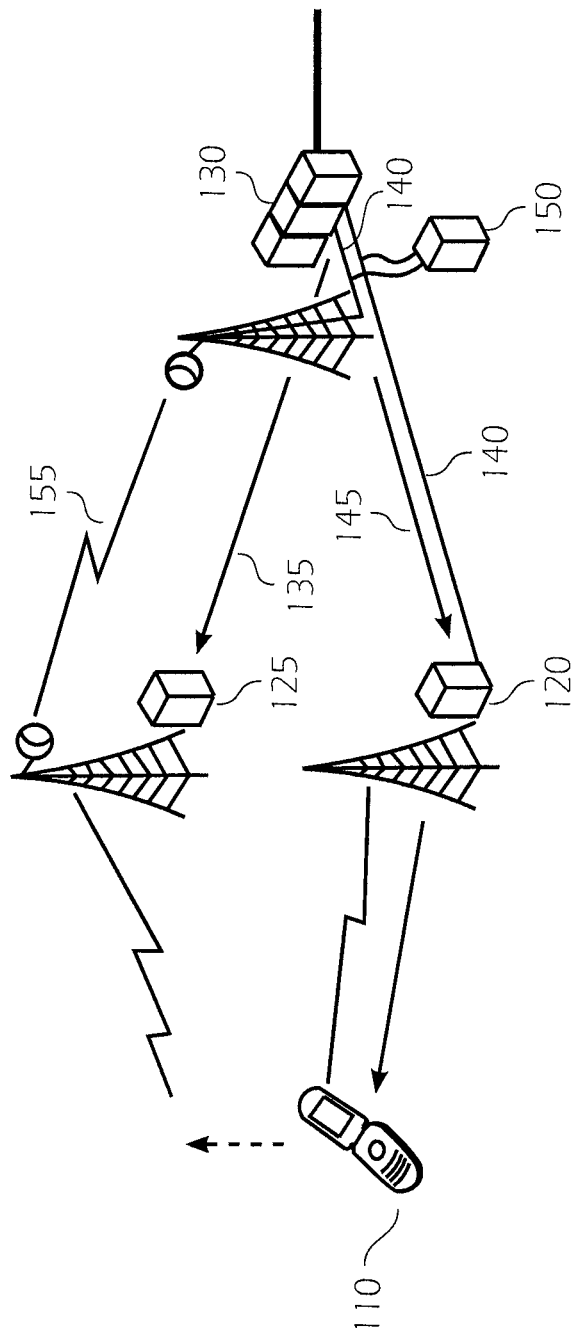
FIG. 1 is a schematic perspective view of a mobile telephone network and a mobile device, monitored by a monitoring instrument according to an embodiment of the present invention.

Referring to FIG. 1, in an exemplary global system for mobile communications (GSM) mobile network, a mobile device 110 may communicate over multiple air channels allocated to one or more base transceiver stations (BTSs). The BTSs may be controlled by a base station controller 130 (BSC). The BSC may be connected to the public switched telephone network (PSTN) through a mobile switching center.

A handover may occur when a mobile device 110, which initially is closer to a first BTS 120 than to a second BTS 125, moves, as indicated by the dashed arrow in FIG. 1, so that it becomes closer to the second BTS 125 than to the first BTS 120. The mobile telephone network detects this situation, e.g., from signal strength indications provided by the mobile device 110, and initiates a handover of the mobile device 110 from the first BTS 120 to the second BTS 125. To execute the handover, the BSC first sends a channel activation message 135 to the second BTS 125, instructing it to activate an air channel for use by the mobile device 110. The BSC then sends a channel assignment message 145 to the first BTS 120, which relays channel assignment message 145 to the mobile device 110, instructing the mobile device 110 to switch to the newly activated air channel. In another example, a BTS may have directional antennas covering different sectors of ground, and as the mobile device 110 moves from one sector into another, a handover may be performed from one air channel on the BTS to another air channel on the same BTS.

Communications between the BSC and the BTSs 120, 125 may be on E1 circuits 140, over wire links or, as shown for the second BTS 125 in FIG. 1, carried by wireless, e.g., microwave communication link 155. A technician may connect a monitoring instrument 150 to the E1 circuits 140 inside the BSC or, as illustrated, outside the BSC, using one or more probes to form one or more probe connections, to monitor signals sent to the first BTS 120 and the second BTS 125. As used herein, a probe is a part of an instrument that connects to an interface and enables the instrument to monitor the data flowing across the interface.

Figure 2:
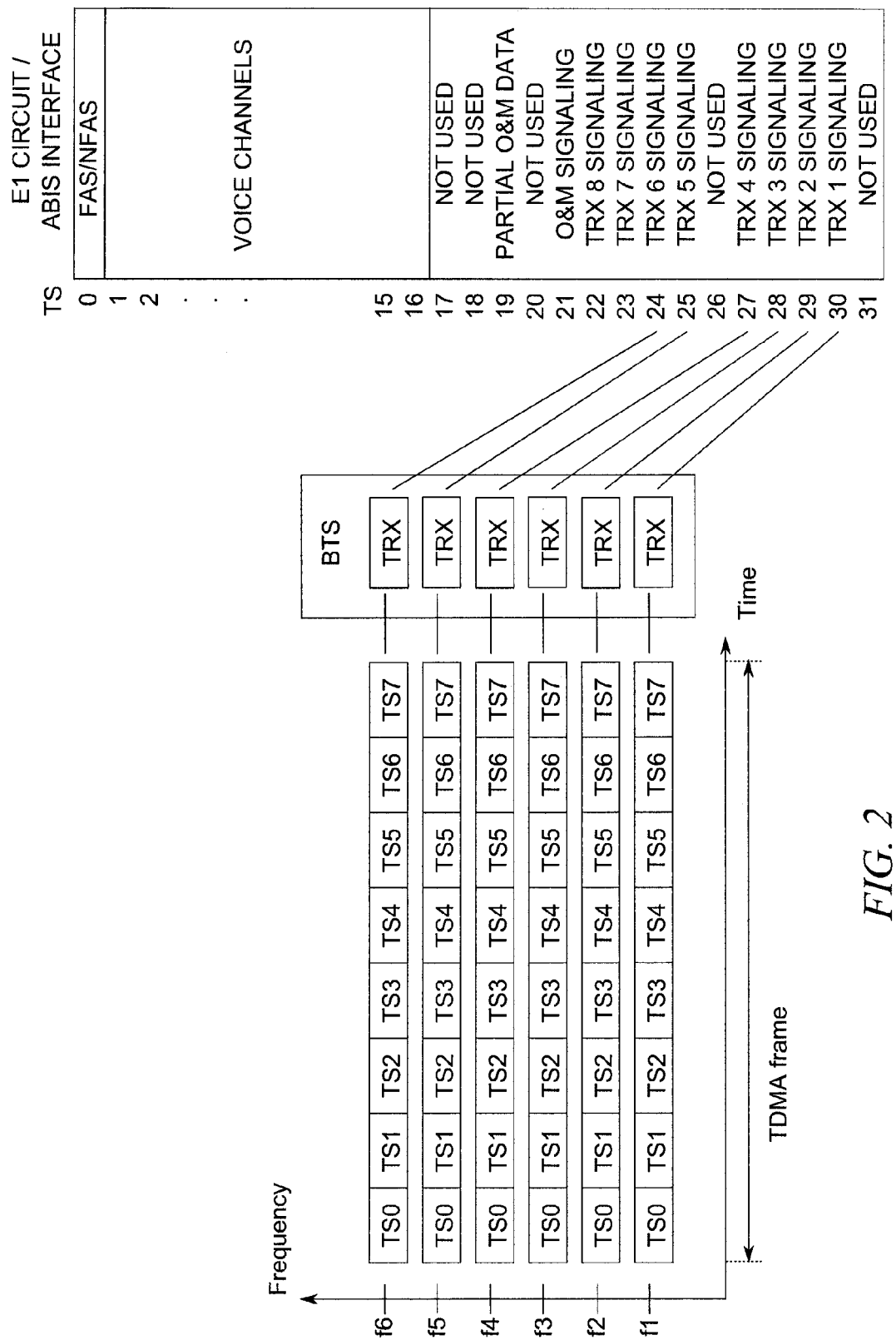
FIG. 2 is a schematic diagram illustrating the correspondence between frequency and time slot allocations, transceivers, and Abis signaling channels according to an embodiment of the present invention.

Referring to FIG. 2, in one embodiment, a BTS has one or more transmitter receivers (TRXs) which may also be referred to as transceivers, each operating at one frequency, identified by an absolute radio frequency channel number (ARFCN). Each frequency is used for eight time division multiple access (TDMA) channels, each designated by a time slot (TS) identified by a number between 0 and 7.

In another embodiment, each TRX operates in a frequency hopping mode, with the frequency hopping patterns selected not to overlap, viz., such that the TRXs within range of a mobile device 110 are all at different frequencies at any point in time. In this case, the frequency hopping pattern of the TRX may be identified by the combination of a mobile allocation index offset (MAIO) and a hopping sequence number (HSN). The present invention is equally suitable for use with fixed frequency systems and with frequency hopping systems, and, as used herein, the term frequency designator refers to either the ARFCN of a TRX, or to the MAIO and HSN of a TRX.

Thus a mobile device 110 will use a time slot and either a fixed frequency or a frequency hopping pattern. This combination of a time slot and a frequency designator is referred to herein as an air channel, and, because each frequency designator corresponds to one TRX, the air channel equivalently designates the combination of a time slot and a TRX. As shown in FIG. 2, a BTS may have, e.g., six TRXs, for a total of 48 air channels. Each TRX is associated with a corresponding Abis time slot, which may also be referred to as an Abis channel. The Abis interface may have 32 channels numbered 0 through 31, each corresponding to an Abis time slot. The Abis interface has voice channels carrying voice information and signaling channels carrying signaling information. The present invention relates to Abis signaling channels.

When a handover occurs from a first air channel to a second air channel, and simultaneously from a first Abis signaling channel to a second Abis signaling channel, the BSC initially sends a channel activation message 135 to activate the second air channel so that it will be ready to continue the connection when the mobile device 110 switches channels. The channel activation message 135 is sent over the second Abis signaling channel and it specifies the time slot of the air channel to be activated. Subsequently, the BSC sends a channel assignment message 145, via the first Abis signaling channel, indicating, to the mobile device 110, the frequency and time slot to which the mobile device 110 is to switch, to effect the handover.

The channel activation message 135 does not contain the post-handover frequency designator, and the channel assignment message 145 does not identify the post-handover Abis signaling channel to be used, although both contain the post-handover air channel time slot. As a result, a monitoring instrument 150 monitoring a call on a mobile device 110 engaged in a handover will not, based on the contents of the channel assignment message 145, have the information necessary to predict the Abis signaling channel on which the call will continue after the handover. In one embodiment of the present invention, however, a monitoring instrument 150 may infer the correspondence between a frequency designator and an Abis signaling channel by monitoring a number of handovers. For this purpose, the monitoring instrument 150 may contain a processor and memory, and the memory may be used to store instructions for execution by the processor. The term "processor" is used herein to include any combination of hardware, firmware, and software, employed to process instructions, data, or digital signals. Processor hardware may include, for example, application specific integrated circuits (ASICs), general purpose or special purpose central processing units (CPUs), digital signal processors (DSPs), graphics processing units (GPUs), and programmable logic devices such as field programmable gate arrays (FPGAs).

Figure 3:
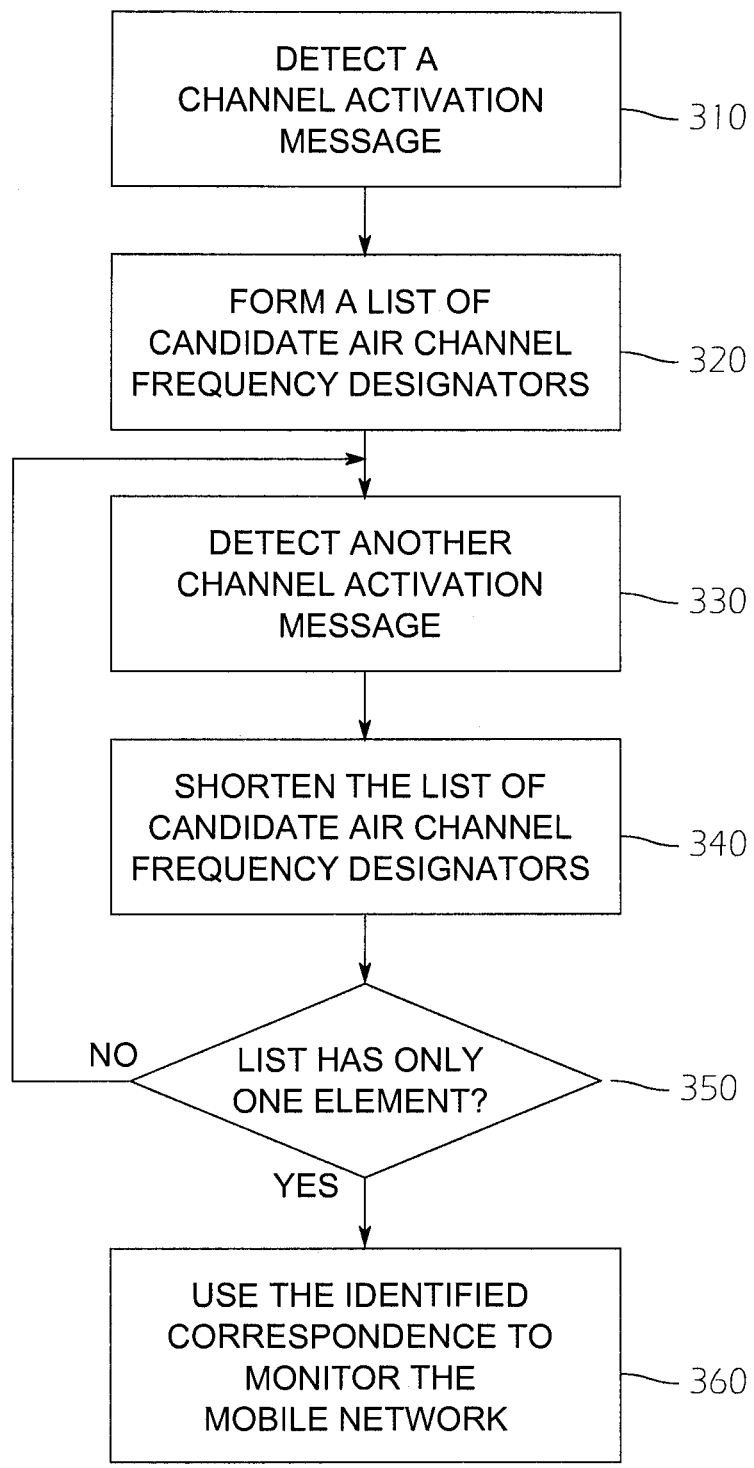
FIG. 3 is a flow chart of a method for GSM channel tracking according to an embodiment of the present invention.

Referring to FIG. 3, the monitoring instrument 150 may detect a first channel activation message 135 on an Abis signaling channel on an E1 line being monitored. It may then, in an act 320, collect all of the channel assignment messages 145 during a time interval following the first channel activation message 135, and form, from the air channel frequency designators they contain, a list of candidates. The list of candidates may be made shorter by saving only those air channel frequency designators for which the activation messages contain the same time slot as the air channel assignment message 145. At most one of these collected candidates corresponds to the first channel activation message 135; the others may correspond to other channel activation messages 135, transmitted on other Abis signaling channels or on other E1 circuits 140. A channel assignment message 145 may be expected to follow the corresponding channel activation message 135 after an interval of as little as a few milliseconds to as much as a few seconds. The monitoring instrument may therefore use an interval of between 2 and 10 seconds to balance the advantage of a reduced likelihood of missing the channel assignment message 145 sought against the advantage of having a shorter list of candidates.

A second channel activation message 135 may then, in an act 330, be detected on the same Abis signaling channel as the first, and used to form a second list of candidate air channel frequency designators in a similar fashion. Air channel frequency designators that are not in both lists of candidates may then, in an act 340, be eliminated, resulting in a shorter list of candidates. If, in an act 350, it is then determined that only one air channel frequency designator remains, a final candidate has been identified; otherwise the process may be repeated until only one air channel frequency designator remains on the list. If a final candidate has been identified, the correspondence, between the Abis signaling channel on which the channel activation message was detected and the air channel frequency designator identified as the one which corresponds to the Abis signaling channel, may be used, in an act 360, to monitor the mobile network.

Similarly, a channel assignment message 145 containing a particular frequency designator may first be identified and a set of channel activation messages 135 detected over some time period ending at the time of the channel assignment message 145 may be used to provide an initial list of candidate Abis signaling channels, which may similarly be shortened by repeating the process and keeping only candidates that have appeared in all previously detected sets.

In either case, when one candidate remains, a correspondence between and Abis signaling channel and an air channel frequency designator has been detected, and an entry may be made in a table of correspondences, which may be stored, e.g., in computer memory, in any of a number of formats, such as an array, a pair of arrays, or a linked list. This table may conceptually be represented as having two columns, one for Abis signaling channels and one or air channel frequency designators, and one row for each correspondence identified.

In some cases the algorithms described above may fail to find a correspondence or may erroneously identify a correspondence when in fact there is none. If, for example, the BSC contains an E1 circuit 140 to which the monitoring instrument 150 is not connected, then it could occur that after a number of iterations of observing channel assignment messages 145 containing a particular frequency designator and detecting a set of corresponding Abis signaling channels, no candidate Abis signaling channels remain. This may occur if the Abis signaling channel which in fact corresponds to the frequency designator observed is in an unmonitored E1 circuit 140. In this case, no entry will be made in the table of correspondences. Similarly, it could occur that one candidate remains, merely as a matter of chance, even though this candidate is not in fact the correct Abis signaling channel, i.e., it is not the Abis signaling channel corresponding to the frequency designator observed. In this case, the system may, after operating for some period of time, make an observation inconsistent with the table entry, e.g., a new search for Abis signaling channels may result in an empty set of candidates, and the entry, which has been found to be incorrect, may be purged from the table.

In one embodiment the monitoring instrument 150 runs in an ongoing manner, initially starting with an empty table, and then continuing to fill the table, or to correct the table if an inconsistency is encountered. In this mode the monitoring instrument 150 may also automatically correct the table if the mobile network is reconfigured, changing the network's correspondences between Abis signaling channels and frequency designators.

The monitoring instrument may have various applications, or be a component of an instrument providing other functions, some of which may rely on the capabilities of the monitoring instrument. For example, if calls are being disconnected just before, during, or just after handovers or attempted handovers in a mobile network, then the monitoring system may be used by a technician to be able to follow the call immediately after the handover. In another example, it may be used by law enforcement to monitor or record mobile telephone conversations, and to continue monitoring and recording after a handover.

Although limited embodiments of a method for GSM channel tracking have been specifically described and illustrated herein, many modifications and variations will be apparent to those skilled in the art. For example, the monitoring instrument 150 need not be employed at the BSC, but may be used at any aggregation point at which one or more E1 circuits 140, feeding BTSs among which handovers may occur, are present. Accordingly, it is to be understood that the method for GSM channel tracking employed according to principles of this invention may be embodied other than as specifically described herein. The invention is also defined in the following claims, and equivalents thereof.

What is claimed is:

1. A monitoring instrument, comprising:
   a processor; and
   a memory, wherein the memory has stored thereon instructions that, when executed by the processor, cause the processor:
   to determine a correspondence between a Global System for Mobile Communications (GSM) air channel frequency designator and an Abis signaling channel, by
      detecting a first channel activation message on the Abis signaling channel;
      detecting, during a first time interval following the first channel activation message, a first set of one or more frequency designators;
      detecting a second channel activation message on the Abis signaling channel;
      detecting, during a second time interval following the second channel activation message, a second set of one or more frequency designators; and
      forming a list of candidate frequency designators comprising frequency designators included in both:
         the first set of one or more frequency designators, and
         the second set of one or more frequency designators; and
   to use the correspondence established when the list of candidate frequency designators contains exactly one frequency designator to identify a post-handover Abis signaling channel corresponding to a post-handover frequency designator.

2. The instrument of claim 1, wherein the first set of one or more frequency designators and the second set of one or more frequency designators comprise one or more absolute radio frequency channel numbers (ARFCNs).

3. The instrument of claim 1, wherein the first set of one or more frequency designators and the second set of one or more frequency designators comprise one or more mobile allocation index offsets (MAIOs) and one or more hopping sequence numbers (HSNs).

4. The instrument of claim 1, wherein the Abis signaling channel is a channel on an E1 circuit.

5. The instrument of claim 1, wherein the length of each of the first time interval and the second time interval is more than 2 seconds and less than 10 seconds.

6. The instrument of claim 1, wherein:
   the detecting of the first channel activation message on the Abis signaling channel comprises detecting a first channel activation message having a first air channel time slot;
   the detecting, during a first time interval following the first channel activation message, of a first set of one or more frequency designators comprises detecting a set of one or more frequency designators associated in channel assignment messages with the first air channel time slot;
   the detecting of a second channel activation message on the Abis signaling channel comprises detecting a second channel activation message having a second air channel time slot; and
   the detecting, during a second time interval following the second channel activation message, of a second set of one or more frequency designators comprises detecting a set of one or more frequency designators associated in channel assignment messages with the second air channel time slot.

7. A method for monitoring a Global System for Mobile Communications (GSM) network, the method comprising:
   determining a correspondence between an air channel frequency designator and an Abis signaling channel; and
   using the correspondence to identify a post-handover Abis signaling channel corresponding to a post-handover frequency designator,
   the determining comprising:
      detecting a first channel activation message on the Abis signaling channel;
      detecting, during a first time interval following the first channel activation message, a first set of one or more frequency designators;
      detecting a second channel activation message on the Abis signaling channel;
      detecting, during a second time interval following the second channel activation message, a second set of one or more frequency designators;
      forming a list of candidate frequency designators comprising frequency designators included in both:
         the first set of one or more frequency designators, and
         the second set of one or more frequency designators; and
      identifying the correspondence when the list of candidate frequency designators contains exactly one frequency designator.

8. The method of claim 7, wherein the first set of one or more frequency designators and the second set of one or more frequency designators comprise one or more absolute radio frequency channel numbers (ARFCNs).

9. The method of claim 7, wherein the first set of one or more frequency designators and the second set of one or more frequency designators comprise one or more mobile allocation index offsets (MAIOs) and one or more hopping sequence numbers (HSNs).

10. The method of claim 7, wherein the Abis signaling channel is a channel on an E1 circuit.

11. The method of claim 7, wherein the length of each of the first time interval and the second time interval is more than 2 seconds and less than 10 seconds.

12. A monitoring instrument, comprising:
a processor; and
a memory, wherein the memory has stored thereon instructions that, when executed by the processor, cause the processor:
to determine a correspondence between a Global System for Mobile Communications (GSM) air channel frequency designator and an Abis signaling channel, by
detecting a first channel assignment message containing a first air channel frequency designator;
detecting, during a first time interval preceding the first channel assignment message, a first set of one or more Abis signaling channel activation messages for activating a first set of one or more Abis signaling channels;
detecting a second channel assignment message containing the first air channel frequency designator;
detecting, during a second time interval preceding the second channel assignment message, a second set of one or more Abis signaling channel activation messages for activating a second set of one or more Abis signaling channels; and
forming a list of candidate Abis signaling channels comprising Abis signaling channels included in both:
the first set of one or more Abis signaling channels, and
the second set of one or more Abis signaling channels; and
to use the correspondence established when the list of candidate Abis signaling channels contains exactly one Abis signaling channel to identify a post-handover Abis signaling channel corresponding to a post-handover frequency designator.

13. The instrument of claim 12, wherein the frequency designator is an absolute radio frequency channel number (ARFCN).

14. The instrument of claim 12, wherein the frequency designator is a combination of a mobile allocation index offset and a hopping sequence number (HSN).

15. The instrument of claim 12, wherein the Abis signaling channel is a channel on an E1 circuit.

16. The instrument of claim 12, wherein the length of each of the first time interval and the second time interval is more than 2 seconds and less than 10 seconds.

17. The instrument of claim 12, wherein:
the detecting of the first channel assignment message containing a first air channel frequency designator comprises detecting a first channel assignment message containing a first air channel frequency designator and a first air channel time slot;
the detecting, during a first time interval preceding the first channel assignment message, a first set of one or more Abis signaling channel activation messages for activating a first set of one or more Abis signaling channels comprises detecting, during a first time interval preceding the first channel assignment message, a first set of one or more Abis signaling channel activation messages, having a first air channel time slot, for activating a first set of one or more Abis signaling channels;
the detecting of a second channel assignment message containing the first air channel frequency designator comprises detecting a second channel assignment message containing the first air channel frequency designator and a second air channel time slot; and
the detecting, during a second time interval preceding the second channel assignment message, of a second set of one or more Abis signaling channel activation messages for activating a second set of one or more Abis signaling channels comprises detecting, during a second time interval preceding the second channel assignment message, a second set of one or more Abis signaling channel activation messages, having a second air channel time slot, for activating a second set of one or more Abis signaling channels.

* * * * *